Aug. 5, 1941.  F. S. HODGMAN ET AL  2,251,279
POWER TRANSMISSION
Filed March 11, 1940  2 Sheets-Sheet 2

INVENTORS
FREDERICK S. HODGMAN
RAYMOND C. GRIFFITH
BY
ATTORNEY

Patented Aug. 5, 1941

2,251,279

UNITED STATES PATENT OFFICE 2,251,279

POWER TRANSMISSION

Frederick S. Hodgman, Glen Rock, N. J., and Raymond C. Griffith, Detroit, Mich., assignors to Sperry Gyroscope Company, Inc., Brooklyn, N. Y., a corporation of New York Application March 11, 1940, Serial No. 323,476

19 Claims. (Cl. 244—78)

This invention relates generally to power transmission systems and particularly to those of the servomotor type especially suitable for operating the control surfaces of aircraft. Many modern aircraft have been provided with so-called automatic pilot mechanisms for operating the control surfaces from a servomotor under the ultimate control of a gyroscopic or other reference of position, a typical automatic pilot mechanism being disclosed in the patent to Elmer A. Sperry, Jr., Bert G. Carlson and Mortimer F. Bates, No. 1,992,970, dated March 5, 1935. Automatic pilot mechanism of this character is arranged to be selectively disabled for manual operation of the controls through the usual cable transmission to which the automatic pilot mechanism is connected.

With very large airplanes and particularly those having very high normal flying speed it becomes extremely difficult to so balance the control surfaces that they may be actuated by manual effort alone under high speed flight conditions without introducing fluttering troubles, at least at some flying speeds and particularly with auxiliary assist surfaces of the so-called "Flettner" type. It is therefore desirable with large aircraft that a follow-up servomotor control be provided whereby the control surfaces may be power actuated to follow the movements of the control stick. Such a servomotor control moreover should be of the character which imparts to the control stick the same feel during manual control of the aircraft which is present in the control stick of a smaller aircraft. In other words, the operation should be such that the restoring forces on the control surfaces should be transmitted to the control stick in lesser but proportional degree. Such a manually-controlled servomotor system should preferably (for weight saving) utilize as much of the mechanism already provided in the automatic pilot as is possible.

For maximum safety it is also desirable that the servomotor control system be such that the control surfaces remain operable directly from the control stick when, due to an emergency, no power is available from the source which supplies the servomotor system. Also under high speed flight conditions a large mechanical advantage between the control stick and the control surface is desirable since a relatively small amplitude of movement at the control surface is all that is necessary. On the contrary, at low flying speeds when the wing flaps or other speed reducing devices are in operation, a wider amplitude of movement of the control surfaces is necessary and a smaller mechanical advantage is needed. Under such conditions it is particularly desirable that the mechanical advantage between the control stick and control surfaces be variable to provide for adequate control by manual effort under the wide range of flying speeds of which modern aircraft are capable.

It has been proposed heretofore, as, for example, in the patents to Leon N. Swisher, No. 2,140,037, for Servo mechanism, issued December 13, 1938, and to Bert G. Carlson, No. 2,165,451, for Servomotor system for aircraft, issued July 11, 1939, to provide a servomotor control system in connection with an automatic pilot whereby the control surfaces may be power operated by follow-up control from the control stick when it is desired to control the aircraft manually rather than automatically from the standard of position. It has also been proposed as in the patent to Stephen J. Zand, No. 2,175,584, for Variable ratio manual controller for aircraft, issued October 10, 1939, to provide a variable mechanical advantage between the control stick and the control surface in a direct manually-operated aircraft control system.

It is an object of the present invention to provide a power transmission system particularly adapted for operating the control surfaces of large aircraft wherein the advantages of each of the above-mentioned patents may be obtained and to further obtain these advantages with fewer mechanical parts and by a simpler and more reliable apparatus. More specifically it is an object to provide a servomotor control system wherein a single servo cylinder may be utilized to operate an aircraft control surface selectively either from the usual standard of position control automatically or from the usual control stick manually; wherein direct cable transmission between the control stick and the control surface is utilized and wherein means is provided for imparting to the stick a portion of the restoring force on the control surface.

A further object is to provide a system of this character which may be operated solely by manual effort in emergencies without lost motion between the control stick and control surfaces.

A further object is to provide a control system of this character wherein the means which transmits a portion of the restoring force on the control surface to the control stick is automatically brought into action upon power failure to serve as a direct telemetric drive connection between the control stick and the control surface, preferably with an increased mechanical advantage as compared with that obtained during power operation under manual control.

It is also an object to provide a control system of this character wherein, during emergency operation by manual effort exclusively, the control surfaces may be operated at either of two mechanical advantages from the control stick.

It is a further object to provide in a system of this character automatic means for changing the mechanical advantage when the wing flaps or other speed reducing devices of the aircraft are brought into operation.

Further objects and advantages of the present invention will be apparent from the following description, reference being had to the accompanying drawings wherein a preferred form of the present invention is clearly shown.

For the purposes of description the four operating conditions of the system to be described may be referred to as (1) "automatic control," when the control surfaces are operated by power from the servomotor under the control of the standard of position embodied in the automatic pilot mechanism; (2) "power manual," when the control surfaces are operated by power applied to the servomotor under manual control from the control stick; (3) "booster manual," when the control surfaces are operated without power from the source by the manual effort applied to the control stick but wherein the servomotor is utilized for providing an increased mechanical advantage over that obtained in power manual operation; and (4) "direct manual," when the control surface is actuated by manual effort applied to the control stick without increase in mechanical advantage. The mechanical advantage above mentioned refers particularly to the ratio between a given displacement of the control stick and the resulting displacement of the control surface rather than to the ratio between the forces thereon since during power manual operation the ratio between forces does not correspond to the ratio between displacements due to the introduction of power from the external source to the servomotor.

Figure 1:
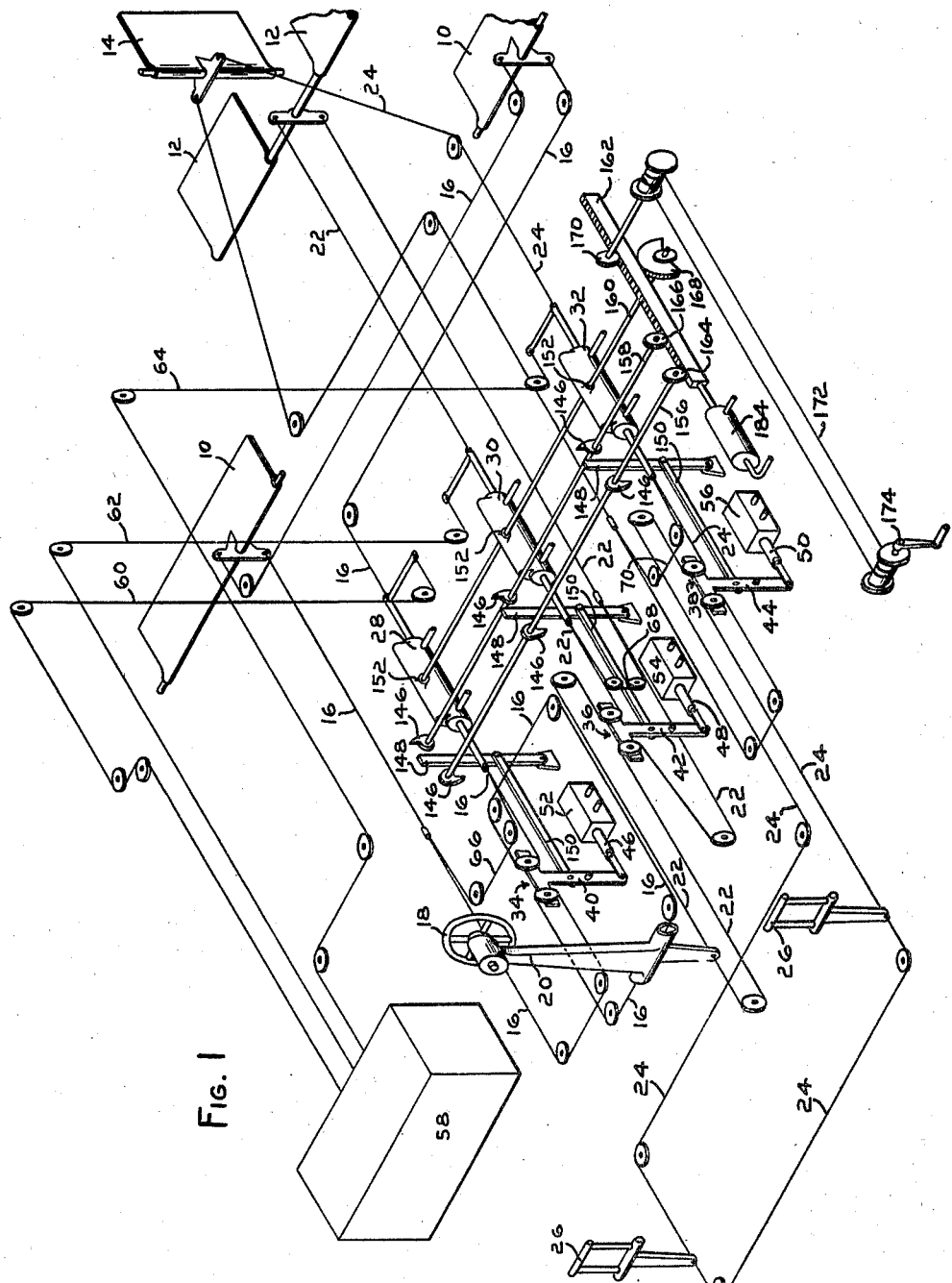
Figure 1 is a diagrammatic view of a control system embodying a preferred form of the present invention showing the cable transmission systems and the automatic gyropilot provided for the three sets of control surfaces with which modern aircraft are customarily provided.

Referring now to Figure 1, there is shown diagrammatically the three sets of control surfaces including the ailerons 10, elevators 12 and rudder 14 of conventional form. These may be either of the balanced or unbalanced type as may be desired. The ailerons 10 are connected by a cable transmission system 16 with the control wheel 18 mounted on the usual stick 20. Similar cable transmission systems 22 and 24 connect the elevators 12 and rudder 14 with the stick 20 and the rudder pedals 26. Each of the cable transmissions is connected to the opposite piston rods of servomotors 28, 30 and 32. The latter may preferably be similar to those customarily provided in automatic pilot mechanisms.

Each of the cable transmissions also includes a differential pulley mechanism 34, 36 and 38 whereby levers 40, 42 and 44 are arranged to be operated in accordance with the difference in relative displacements between the control wheel, stick or pedal and the corresponding control surface. The levers 40, 42 and 44 are connected to operate the stems 46, 48 and 50 of servomotor control valves 52, 54 and 56 which serve to control the admission of pressure fluid from a suitable source to opposite ends of the servomotors. A suitable automatic pilot control unit is indicated at 58 and may contain the customary balanced valves for controlling the servomotors as is clearly described in the patent to Sperry and Bates previously referred to. Follow back cable connections 60, 62 and 64 are provided between the servomotors and the control unit 58. For the purpose of avoiding transmission of the full tension necessary to operate the control surfaces through the differential pulley mechanisms, each of the cable transmission systems may be provided with a jumper or "messenger" cable 66, 68 and 70 adjacent the forward end of the corresponding servomotor.

Figure 2:
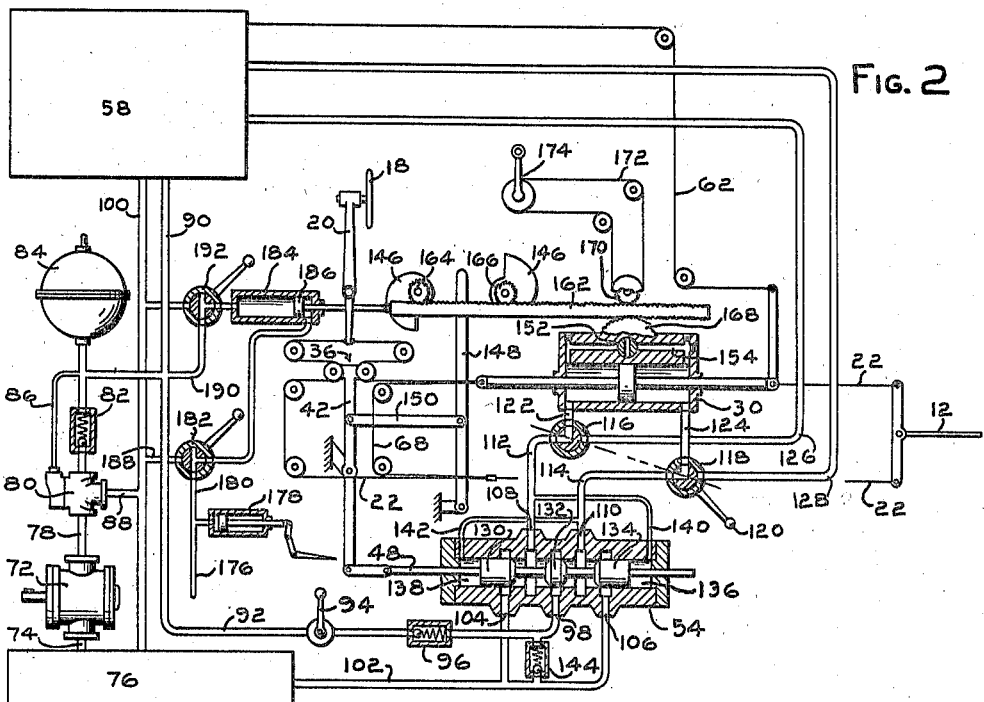
Figure 2 is a diagrammatic view of a control system for one such set of control surfaces showing in addition the hydraulic circuit for operation of the servomotor.

Referring now to Figure 2, there is illustrated diagrammatically the hydraulic circuit and control system for one of the sets of control surfaces, namely, the elevators 12. Forming a source of pressure fluid supply is a pump 72, which may be engine or otherwise driven, having a suction conduit 74 for withdrawing oil or other suitable power transmission liquid from a tank 76. A delivery conduit 78 of the pump 72 extends through an unloading valve 80 and check valve 82 to an accumulator 84. The unloading valve 80 is arranged to be controlled through a branch conduit 86 beyond the check valve 82 so that when the pressure in the accumulator rises to a predetermined point the valve 80 is opened to bypass the full pump delivery to tank through a bypass conduit 88 and, when the pressure again falls, to close, causing the full pump delivery to be delivered through the check valve 82.

The delivery conduit 78 has a branch 90 extending to the control unit 58 and a branch 92 extending through a needle valve 94 and check valve 96 to the pressure port 98 of the pilot valve 54. A tank conduit 100 extends between the control unit 58 and the tank 76 while a tank conduit 102 extends from the tank ports 104 and 106 of valve 54 to the tank 76. The motor ports 108 and 110 of the pilot valve 54 connect by conduits 112 and 114 with a pair of three-way selector valves 116 and 118 connected together for actuation by a common handle 120. The valves 116 and 118 serve to selectively connect conduits 122 and 124 with either the conduits 112 and 114 as shown or with a pair of conduits 126 and 128 which lead from the balanced valve in the automatic pilot control unit 58. Conduits 122 and 124 being connected to opposite ends of the servomotor 28 it will be obvious that with the selector valves in the position illustrated the servomotor is under the control of pilot valve 54. When shifted ninety degrees the pilot valves will connect the servomotor for control by the balanced valves in the unit 58.

The pilot valve 54 is provided with a shiftable spool having three lands 130, 132 and 134 arranged to act as a conventional four-way reversing valve well known in the art. The chambers 136 and 138 at the opposite ends of the valve body are connected by conduits 140 and 142 with the conduits 112 and 114 which lead to the servomotor cylinder. The effective area of these end chambers is so chosen as to provide a predetermined ratio between that area and the effective area of the servomotor 28.

The spacing between the various ports in the valve body and the lands on the valve spool is so arranged that in neutral position there is practically no overlap between the land 132 and the two side edges of the port 98 so that a slight bleed of pressure fluid occurs to both motor ports 108 and 110. The lands 130 and 134 in the neutral position may also have practically no overlap with the inner edges of tank ports 104 and 106 so that pressure fluid from the ports 108 and 110 may also bleed to tank. Thus if these two bleed paths are equal, the pressure in the motor ports will be half the available pressure in the pressure port 98, it being obvious that other arrangements of either slightly positive or negative overlap at either the pressure port or at the tank ports may be utilized.

The spacing of the ports and valve spool lands is furthermore so arranged that a substantial overtravel of the valve spool is possible after the spool has moved to a position wherein each of the ports is wide open, and this overtravel is preferably considerably greater than the amount of travel needed to fully open the valve in either direction. This overtravel is utilized as will be described later during booster manual operation wherein the lands 130 and 134 act as pistons in the chambers 138 and 136 and with the conduits 140, 142, 112, 114, 122 and 124 constitutes a telemetric connection between the valve stem 48 and the servomotor piston. During such operation it is desirable to avoid cavitation in the telemetric system due to possible leakage of liquid and for this purpose a check valve 144 connects between the tank conduit 102 and the pressure conduit 92 and is open for free flow from the former to the latter.

For direct manual operation it is necessary to disable the differential pulley mechanism 36 and also disable the servomotor 30. For this purpose a pair of spiral cams 146 are arranged adjacent a lever 148 connected by a link 150 with the lever 42, and, when in the position shown, do not interfere with the full stroke in both directions of the levers 42 and 148. When the cams are rotated clockwise substantially two hundred seventy degrees, the cams will bring the lever 148 to its central position and hold it rigidly there. It will be obvious that the cams may be arranged to act directly on the lever 42 or the valve stem 48, the present arrangement being shown for clarity in the diagrammatic layout rather than for utilitarian design. For disabling the servomotor 30 the customary bypass valve 152 may be provided serving to open or close a bypass conduit 154 extending between opposite ends of the servomotor cylinder.

Each of the control systems shown in Figure 1 may be provided with a similar set of spiral cams and bypass valves arranged upon common shafts 156, 158 and 160. Preferably a common operating means for the three shafts is provided and is indicated diagrammatically as comprising a rack 162 meshing with gears 164, 166 and 168 mounted upon the ends of the respective shafts. The rack 162 may be operated manually by means of a pinion 170 also meshing with the rack 162 and connected by a cable transmission 172 with a hand crank 174 arranged in a convenient position to the pilot's station.

Preferably automatic means is provided for operating the rack 162 in response to movement of the wing flaps into speed reducing position. Conveniently the pressure fluid delivery line 176 to which pressure is supplied to the flap-operating cylinder 178 from a different pressure fluid source, when the flaps are to be lowered, has a branch 180 extending through a three-way selector valve 182 to the rod end of a cylinder 184. In the cylinder 184 is a piston 186 the rod of which is connected with the rack 162. Thus with the selector valve 182 in the position illustrated, whenever fluid pressure is admitted through conduit 176 to the flap-operating cylinder 178, this pressure is also transmitted through conduit 180 to the rod end of cylinder 184 shifting the piston 186 and rack 162 to the left, thus rotating the cams 146 clockwise and also rotating the bypass valves 152 counterclockwise to open position. When it is desired to dispense with automatic operation of the disabling means 146 and 152, the selector valve 182 may be shifted to connect the rod end of cylinder 184 with the tank line through a branch conduit 188 and to cut it off from the branch line 180.

In case it is desired to make automatic operation of the disabling means dependent upon failure of the pressure source, the head end of cylinder 184 may be connected by a conduit 190 and selector valve 192 with the delivery conduit 78 of pump 72. Thus the pressure from accumulator 84 acting over the large area of piston 186 may be predominant over the pressure from the other source acting on the small area at the rod end of piston 186 and prevent leftward movement thereof so long as pressure exists in conduit 78. The selector valve 192 may be shifted counterclockwise ninety degrees to connect the head end of cylinder 184 with the tank conduit 100 and cut it off from the conduit 190 whenever it is desired to dispense with this feature.

Figure 3:
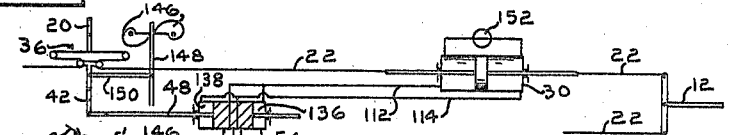
Figure 3 is a simplified diagram of the control system showing the parts in stable position and arranged for direct manual actuation of the control surface.

In order to more clearly understand the operation of the mechanism, reference may be had to the diagrams of Figures 3 through 7 inclusive. In Figure 3 the cams 146 have been rotated to their locking position, and the bypass valve 152 has been opened by movement of rack 162 to the left either manually by the crank 174 or automatically by the piston 186 when the wing flaps have been lowered. This condition of operation may be utilized while pressure is available in the accumulator 84 by shifting valve 192 to connect cylinder 184 with tank. On the other hand, if it is desired to make it impossible to use the direct manual control except when pressure is not available at the accumulator 84, the valve 192 may be left in the position illustrated. Likewise in either case the direct manual control may be made available either under manual initiation by shifting rack 162 to the left by operation of the hand crank 174 or may be initiated automatically by lowering of the wing flaps when valve 182 remains in the position shown in the drawings. Under any circumstances, when the disabling means 146 and 152 have been operated, the differential pulley mechanism is thereby immobilized, and the servomotor is by-passed permitting free flow of oil between its opposite ends and thereby imposing a negligible drag on the servomotor piston and the cable transmission. Under these conditions it will be seen that the cable transmission 22 constitutes a direct operative connection between the stick 20 and the elevator 12 since the differential pulley mechanism 36 now acts as a mere set of fixed pulleys over which the cable passes. Thus any movements imparted to the stick 20 are directly transmitted to the elevator 12 by the cable transmission without lost motion of any kind.

Figure 4:
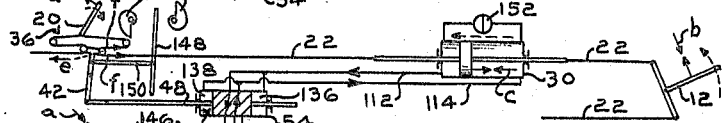
Figure 4 is a view corresponding to Figure 3 showing the position of the parts during movement of the control surface by power under manual control.
Figure 5:
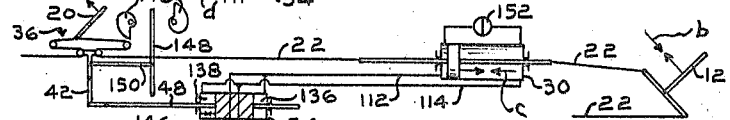
Figure 5 is a view corresponding to Figure 3 showing the position of the parts while the stick and control surface are being held in displaced position during power operation.
Figure 6:
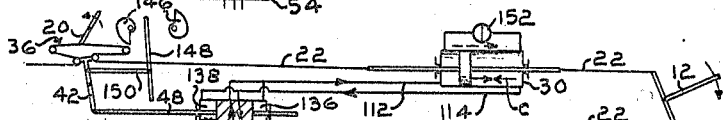
Figure 6 is a view corresponding to Figure 3 showing the position of the parts during the self-restoring action when the stick has been released.

Referring now to Figures 4 through 6, the power manual control condition is there illustrated. For purposes of explanation it will be convenient to assume certain representative ratios which, it will be understood, are given by way of example rather than by way of limitation and that other suitable ratios may be chosen in accordance with the requirements of any given aircraft design problem. First, it will be assumed that the effective area of the lands 130 and 134 acting in the chambers 138 and 136 is one-half the effective area of the piston in servomotor 30. Next, it may be assumed that the ratio in the differential pulley mechanism 36 is two to one. By this is meant that for every cable movement imparted by the stick 20 while the elevator 12 remains stationary, the upper end of lever 42 will be moved one-half that distance. Also for every movement of elevator 12 while stick 20 remains stationary the upper end of lever 42 will be moved one-half that distance. This ratio for simplicity ignores the angular effects introduced by the arcuate path of the pulleys on the upper end of lever 42 which error may be eliminated in practical design by mounting the pulleys 36 on opposite ends of the stem 48 of valve 54, the present arrangement being shown for clarity of illustration. It will also be assumed that the ratio of movements between the top and bottom ends of lever 42 is one-to-one. Also it will be assumed for simplicity that the stick 20 is a one-to-one ratio as between its top and bottom ends.

If now, as shown in Figure 4, the stick 20 be pulled back by manual effort, the first movement of the stick will not move the elevator 12 but instead will, through the differential pulley arrangement, shift the lever 42 clockwise which carries with it the valve stem 48. This movement of the valve stem continues until the valve has opened pressure port 98 to motor port 110 sufficiently so that oil is delivered to the right end of servomotor cylinder 30 at the same rate as the stick is being moved. From then on the servomotor piston continues to move to the left at the same speed as the stick movement thus carrying the elevator upwardly.

In Figures 4 through 6, dotted arrows are used to indicate the direction of movement of parts which are in motion. The solid arrows are used to indicate the forces of action and reaction at the various points in the mechanism where these forces are transmitted between two mediums. Thus the human pilot manually applies a force indicated by the arrow $a$ to the stick 20 which reacts by an almost equal and opposite force. The magnitude of this force depends upon the force of the moving air on elevator 12 indicated by the arrow $b$ and the equal and opposite reaction thereto. This force is transmitted through cable transmission 22 to the piston of the servomotor 30, and equal and opposite reaction forces are exerted between the liquid under pressure and the righthand face of the servomotor piston as indicated by the arrow $c$. Thus the forces $c$ and $b$ are not of the same magnitude, differing by the amount of tension in the cable at the left end of the servomotor plus the amount of frictional resistance in the control system. The magnitude of the hydraulic pressure is determined solely by the magnitude of the force $b$ so long as it is below the pressure available at the accumulator 84. This pressure is transmitted through conduits 114 and 142 to the end chamber 138 where it reacts as indicated by the arrow $d$ on the valve land 130. The force (as distinguished from pressure) at this point is one-half the force indicated at $c$ since the hydraulic pressure acts over an area one-half as great. This force is transmitted in one-to-one ratio through the lever 42 to the differential pulley as indicated by the arrow $e$, the reaction being divided into two equal parts on the two cable portions as indicated by the arrows $f$ and $f'$. By a summation of these forces throughout the system it will be found that with the particular ratios assumed the force $a$ is equal to one-fifth of the force $b$.

Referring now to Figure 5 there is illustrated the condition when the stick is stopped and held in its fully back position by manual force indicated by the same arrow $a$ against the same air reaction $b$ on the elevator 12. Under these conditions when movement of the control stick stops, the valve 54 is in its open position so that the movement of the servomotor and elevator continues a short distance permitting lever 42 to return to neutral position, thus closing pilot valve 54. The force reactions present in Figure 4 are, however, present in substantially the same degree in Figure 5.

If the stick be now released the action which takes place is illustrated in Figure 6. Under these conditions the hydraulic pressure in chamber 138 is now free to shift the valve stem 48 to the right, initially returning the stick toward neutral position a slight distance and opening the pilot valve for flow from port 98 to port 108 thus causing rightward travel of the servomotor piston and causing the elevator 12 to return to neutral position. When it reaches neutral position the air pressure on both sides will be equal thus building up pressure in the chamber 136 of the pilot valve and restoring the latter and the lever 42 to neutral position.

Figure 7:
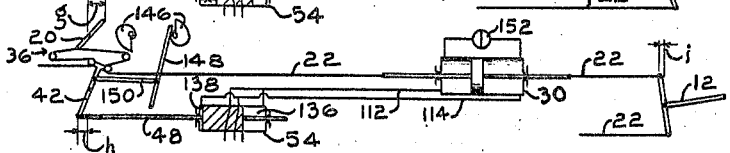
Figure 7 is a view corresponding to Figure 3 showing the position of the parts with the stick fully displaced during direct manual actuation at increased mechanical advantage.

The action which takes place during booster manual operation is illustrated in Figure 7. Under these conditions, the disabling means 146 and 152 being inoperative and the supply of pressure fluid from the source 84 having been cut off by accidental emergency or by closing valve 94, it will be seen that if the stick is moved back the lever 42 will be shifted clockwise carrying the pilot valve stem 48 to the left. The first movement will, of course, open port 98 to port 110, but since no pressure is available at port 98, the servomotor piston will be moved by the oil displaced from chamber 138 through conduits 142, 114 and 124 to the righthand end of servomotor 30. Oil cannot escape from this part of the circuit through the port 98 due to the check valve 96. The oil discharged from the left end of servomotor 30 is delivered through conduits 122, 112 and 140 to the chamber 136 which takes up a volume equal to that discharged from chamber 138. Under these conditions a direct hydraulic telemetric connection is established between valve stem 48 and servomotor 30. The mechanical advantage in this case with the particular ratios assumed gives the stick a five to one advantage over the elevator, that is, the distance *g* which the stick moves is five times the distance *i* which the elevator moves.

It will be noted that in the case of accidental failure of the fluid pressure source the system changes automatically from power manual to booster manual operation since mere lack of pressure at the entrance to check valve 96 causes the latter to close whenever the pilot valve stem 48 is moved out of neutral position. Thus it is unnecessary for the human pilot to realize, that the pressure source has failed and to shift any selective controls to change over from power manual to booster manual operation. In fact, even during power manual operation, the booster action described in the preceding paragraph is in operation and acts to move the control surface slightly during the initial travel of the pilot valve away from neutral position.

If it should so happen that pressure failure occurs while the stick and rudder are displaced from neutral position (during power manual operation), the resulting change in ratio between stick motion and elevator motion might result in inability to restore the rudder to neutral position even though the stick be moved to its opposite extreme position. This difficulty is avoided automatically by the action of the check valve 144. Thus, assuming the parts to be in the position of Figure 5, when a pressure failure occurs, should the pilot desire to restore the elevator to neutral position he may release the stick which, under the action of the pressure exerted in end chamber 138, will move forward slightly as the valve stem 48 moves to the right. This opens the righthand end of the servomotor to tank through ports 110 and 106 and opens the lefthand end to the pressure pipe through ports 108 and 98. The air forces on the elevator are now free to return the same to neutral discharging oil from the right end of the servomotor. Oil required to fill the lefthand end is drawn in by suction through check valve 144 and ports 98 and 108. The elevator thus returns to neutral and in so doing returns the stick to neutral while valve stem 48 remains stationary. It will thus be seen that the telemetric connection is automatically "synchronized" by action of check valve 144.

During flight at low speed with the flaps down when less effort is required to move the control surfaces and when a wider amplitude of their movement is necessary in order to obtain the necessary control of the aircraft, the system may be either automatically or manually changed over to direct manual operation by shifting the rack 162 to open bypass valve 152 and to immobilize the lever 142. This changeover may be made either with or without pressure being available from the source.

While the form of embodiment of the invention as herein disclosed constitutes a preferred form, it is to be understood that other forms might be adopted, all coming within the scope of the claims which follow.

What is claimed is as follows:

1. In a fluid servomotor system for aircraft, a fluid pressure motor for turning the control surface, a source of pressure fluid, an operating valve controlling the flow of fluid to and from said motor, including a valve rod moved by the governing impulse, a piston connected with said rod, and means for leading the pressure fluid to said piston to resist or oppose the governing impulse, said piston having an available stroke substantially greater than necessary to fully actuate the valve and being effective through said means, when moved by the governing impulse, to actuate the motor solely by fluid trapped in front of said piston when fluid from said source is unavailable.

2. In a fluid servomotor system for aircraft, a fluid pressure motor for turning the control surface, a source of pressure fluid, an operating valve controlling the flow of fluid to and from said motor, including a valve rod moved by the governing impulse, a piston connected with said rod, and means for leading the pressure fluid to said piston to resist or oppose the governing impulse, said piston having an available stroke substantially greater than necessary to fully actuate the valve and being effective through said means, when moved by the governing impulse, to actuate the motor solely by fluid trapped in front of said piston when fluid from said source is unavailable, the effective displacements of said motor and said piston being chosen to provide a mechanical advantage of the governing impulse with respect to motion of the control surface.

3. In an airplane fluid-operated servo system having an automatic pilot, the combination with the main piston and cylinder of the automatic pilot for turning a control surface in either direction, an operating valve movable in either direction from its normal shut-off position to cause pressure fluid flow in either direction to said cylinder, including a member movable in either direction by primary impulses, and fluid pressure means connected therewith, for resisting or opposing the primary impulses responsive to the direction and pressure of fluid flow to and from said cylinder, said fluid pressure means being effective to deliver trapped fluid to the main cylinder for turning the control surface in either direction when the flow of pressure fluid through said valve is rendered unavailable.

4. In a servo mechanism for operating the control surface of an aircraft, a power cylinder having a movable piston connected to the control surface for actuating the latter, a valve and valve casing, means for supplying fluid under pressure to said valve casing and for conducting pressure fluid therefrom to said power cylinder, manually operable means for moving said valve within its casing to control the flow of fluid to said power cylinder, and means for causing said pressure fluid to exert a back pressure on said valve so that the resistance offered to the manual movement of said valve within its casing is substantially proportional to the resistance to movement offered by the control surface, said last means being effective, while the fluid supplying means is ineffective, to provide a telemetric fluid drive between the manually operable means and the control surface.

5. In a servo mechanism for operating the control surface of an aircraft, a power cylinder having a movable piston connected to the control surface for actuating the latter, a valve and valve casing, said casing being fixedly mounted, means for supplying fluid under pressure to said valve casing and for conducting pressure fluid therefrom to said power cylinder, manually operable means for moving said valve within its casing to control the flow of fluid to said power cylinder, and means for causing said pressure fluid to exert a back pressure on said valve so that the resistance offered to the manual movement of said valve within its casing is substantially proportional to the resistance to movement offered by the control surface.

6. In a servo mechanism for operating the control surface of an aircraft, a power cylinder having a movable piston connected to the control surface for actuating the latter, a valve and valve casing, said casing being fixedly mounted, means for supplying fluid under pressure to said valve casing and for conducting pressure fluid therefrom to said power cylinder, manually operable means, including a control element differentially connected to the valve and control surface, for moving said valve within its casing to control the flow of fluid to said power cylinder, and means for causing said pressure fluid to exert a back pressure on said valve so that the resistance offered to the manual movement of said valve within its casing is substantially proportional to the resistance to movement offered by the control surface.

7. A servomotor system for operating an aircraft control surface including a servomotor connected to operate the control surface, a manually shiftable governing member for imparting governing movements, a shiftable motor controller differentially connected for operation by the governing member and the control surface and arranged to selectively control the application of power from a suitable source to said motor with a predetermined ratio between movements of the governing member and movements of the control surface, and means associated with said controlller to transmit to the control surface and in a different ratio force manually applied at the governing member.

8. A servomotor system for operating an aircraft control surface including a servomotor connected to operate the control surface, a manually shiftable governing member for imparting governing movements, a shiftable motor controller differentially connected for operation by the governing member and the control surface and arranged to selectively control the application of power from a suitable source to said motor with a predetermined ratio between movements of the governing member and movements of the control surface, and means associated with said controller to transmit to the control surface and in a different ratio force manually applied at the governing member, said means being normally ineffective to move the control surface during power operation of the servomotor and automatically brought into effective operation by movement of the governing member when power from said source is unavailable at the controller.

9. A servomotor system for operating an aircraft control surface including a servomotor connected to operate the control surface, a manually shiftable governing member for imparting governing movements, a shiftable motor controller differentially connected for operation by the governing member and the control surface and arranged to selectively control the application of power from a suitable source to said motor with a predetermined ratio between movements of the governing member and movements of the control surface, means associated with said controller to transmit to the control surface and in a different ratio force manually applied at the governing member, and means for selectively disabling the last means whereby the governing member may directly actuate the control surface in said predetermined ratio independently of the servomotor.

10. A servomotor system for operating an aircraft control surface including a servomotor connected to operate the control surface, a manually shiftable governing member for imparting governing movements, a shiftable motor controller differentially connected for operation by the governing member and the control surface and arranged to selectively control the application of power from a suitable source to said motor with a predetermined ratio between movements of the governing member and movements of the control surface, means associated with said controller to transmit to the control surface and in a different ratio force manually applied at the governing member, and a locking device for the controller and a disabling mechanism for the servomotor whereby the governing member may directly actuate the control surface in said predetermined ratio independently of the servomotor.

11. A servomotor system for operating an aircraft control surface, said aircraft being provided with a device for selectively reducing its flying speed, including a servomotor connected to operate the control surface, a manually shiftable governing member for imparting governing movements, a shiftable motor controller differentially connected for operation by the governing member and the control surface and arranged to selectively control the application of power from a suitable source to said motor with a predetermined ratio between movements of the governing member and movements of the control surface, means associated with said controller to transmit to the control surface and in a different ratio force manually applied at the governing member, means for selectively disabling the last means whereby the governing member may directly actuate the control surface in said predetermined ratio independently of the servomotor, and a connection for operating the disabling means in response to operation of the aircraft speed reducing device.

12. A servomotor system for operating an aircraft control surface including a servomotor connected to operate the control surface, a manually shiftable governing member for imparting governing movements, a shiftable motor controller differentially connected for operation by the governing member and the control surface and arranged to selectively control the application of power from a suitable source to said motor with a predetermined ratio between movements of the governing member and movements of the control surface, means associated with said controller to transmit to the control surface and in a different ratio force manually applied at the governing member, and manually operable means for selectively disabling the last means whereby the governing member may directly actuate the control surface in said predetermined ratio independently of the servomotor.

13. A servomotor system for operating an aircraft control surface including a servomotor connected to operate the control surface, a manually shiftable governing member for imparting governing movements, a shiftable motor controller differentially connected for operation by the governing member and the control surface and arranged to selectively control the application of power from a suitable source to said motor with a predetermined ratio between movements of the governing member and movements of the control surface, means associated with said controller to transmit to the control surface and in a different ratio force manually applied at the governing member, means for selectively disabling the last means whereby the governing member may directly actuate the control surface in said predetermined ratio independently of the servomotor, and means preventing operation of the disabling means while power is available at the motor controller.

14. A servomotor system for operating an aircraft control surface including a servomotor connected to operate the control surface, a manually shiftable governing member for imparting governing movements, a shiftable motor controller differentially connected for operation by the governing member and the control surface and arranged to selectively control the application of power from a suitable source to said motor with a predetermined ratio between movements of the governing member and movements of the control surface, and means associated with said controller to transmit to the control surface and in a different ratio force manually applied at the governing member, said means being normally ineffective to move the control surface during power operation of the servomotor and serving to transmit a predetermined proportion of the reaction force on the control surface to said governing member.

15. A servomotor system for operating an aircraft control surface including a servomotor connected to operate the control surface, a manually shiftable governing member for imparting governing movements, a shiftable motor controller arranged to selectively control the application of power from a suitable source to said motor, a cable transmission directly connecting the governing member with the control surface and including a differential connection to the motor controller, and means for transmitting a portion of the reaction force on said control surface to said controller in opposition to movements imparted to the controller by the governing member.

16. A servomotor control system for an aircraft control surface including a fluid pressure servomotor connected to operate the control surface, a manually shiftable governing member for imparting governing movements, a motor controlling valve having a member differentially connected with the governing member and the control surface and shiftable to selectively direct the flow of pressure fluid from a suitable source to said motor with a predetermined ratio between movements of the governing member and movements of the control surface, and means to transmit to the control surface, and in a different ratio, force manually applied at the governing member.

17. A servomotor control system for an aircraft control surface including a fluid pressure servomotor connected to operate the control surface, a manually shiftable governing member for imparting governing movements, a motor controlling valve having a member differentially connected with the governing member and the control surface and shiftable to selectively direct the flow of pressure fluid from a suitable source to said motor with a predetermined ratio between movements of the governing member and movements of the control surface, means to transmit to the control surface, and in a different ratio, force manually applied at the governing member, and means for selectively disabling the last means whereby the governing member may directly actuate the control surface in said predetermined ratio independently of the servomotor.

18. A servomotor control system for an aircraft control surface including a fluid pressure servomotor connected to operate the control surface, a manually shiftable governing member for imparting governing movements, a motor controlling valve having a member differentially connected with the governing member and the control surface and shiftable to selectively direct the flow of pressure fluid from a suitable source to said motor with a predetermined ratio between movements of the governing member and movements of the control surface, and piston and cylinder means operatively connected with the valve member and in fluid communication with the servomotor, said piston and cylinder means serving both to provide a self-restoring "feel" to the governing member while fluid pressure is available from the source and to provide a telemetric drive connection between the governing member and control surface when fluid pressure is not available.

19. A servomotor system for operating an aircraft control surface including a servomotor connected to operate the control surface, a manually shiftable governing member for imparting governing movements, power-operated follow-up control means for actuating the motor, and means for selectively actuating the control surface by direct manual effort from the governing member at either of two different ratios of mechanical advantage.

FREDERICK S. HODGMAN.
RAYMOND C. GRIFFITH.